United States Patent
Jeong

(10) Patent No.: US 11,433,433 B2
(45) Date of Patent: Sep. 6, 2022

(54) APPARATUS FOR CLEANING LIDAR SENSOR

(71) Applicants: HYUNDAI MOTOR COMPANY, Seoul (KR); KIA MOTORS CORPORATION, Seoul (KR)

(72) Inventor: Heui Jae Jeong, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 455 days.

(21) Appl. No.: 16/597,732

(22) Filed: Oct. 9, 2019

(65) Prior Publication Data

US 2020/0179988 A1    Jun. 11, 2020

(30) Foreign Application Priority Data

Dec. 10, 2018 (KR) .................. 10-2018-0158600

(51) Int. Cl.
*G01S 7/497* (2006.01)
*B08B 1/00* (2006.01)

(52) U.S. Cl.
CPC .............. *B08B 1/008* (2013.01); *B08B 1/005* (2013.01); *G01S 7/497* (2013.01); *G01S 2007/4977* (2013.01)

(58) Field of Classification Search
CPC ... B60S 1/56; B08B 3/02; B08B 1/008; G01S 4/797
See application file for complete search history.

(56) References Cited

U.S. PATENT DOCUMENTS

| | | | |
|---|---|---|---|
| 2008/0000037 A1* | 1/2008 | Christopher | G02B 6/3866 15/210.1 |
| 2018/0207684 A1* | 7/2018 | Miron | B08B 1/008 |
| 2021/0200213 A1* | 7/2021 | Gillett | G01S 17/931 |

* cited by examiner

*Primary Examiner* — Michael D Jennings

(74) *Attorney, Agent, or Firm* — Morgan, Lewis & Bockius LLP

(57) ABSTRACT

An apparatus for cleaning a light detection and ranging (LiDAR) sensor includes: a pivot frame rotatably mounted with respect to the LiDAR sensor; a cleaning wire mounted on the pivot frame, and having a straight portion contacting a surface of the LiDAR sensor; and a drive mechanism allowing the pivot frame to pivot, wherein rotating of the pivot frame allows the straight portion of the cleaning wire to contact the surface of the LiDAR sensor.

15 Claims, 18 Drawing Sheets

APPARATUS FOR CLEANING LIDAR SENSOR

CROSS-REFERENCE TO RELATED APPLICATION

This application is based on and claims the benefit of priority to Korean Patent Application No. 10-2018-0158600, filed on Dec. 10, 2018 in the Korean Intellectual Property Office, the entire disclosure of which is incorporated herein by reference.

TECHNICAL FIELD

The present disclosure relates to an apparatus for cleaning a light detection and ranging (LiDAR) sensor, and more particularly, to an apparatus for cleaning a LiDAR sensor capable of effectively removing a blockage or sticky material attached to the surface of the LiDAR sensor.

BACKGROUND

Vehicles are equipped with a variety of sensors, cameras, electronic devices, and the like, in order to improve vehicle safety technology and driver's convenience. In recent years, research and development on technologies, such as advanced driver assistance system (ADAS) and autonomous vehicles, have actively been conducted.

In order to effectively achieve improvements in the vehicle safety technology and the driver's convenience, it is necessary to accurately recognize the environments of the vehicle such as its surrounding terrain, nearby vehicles, pedestrians, and road conditions when the vehicle is driving or is parked. To this end, a light detection and ranging (LiDAR) sensor may be mounted on a front bumper, a roof, or the like of the vehicle.

In particular, various foreign objects such as insects, mud, and vinyl may be attached to the surface of the LiDAR sensor mounted on the front of the vehicle. Such foreign objects may degrade the detection performance of the LiDAR sensor, and thus it is required to clean the surface of the LiDAR sensor.

A conventional apparatus for cleaning a LiDAR sensor may be configured to inject a high-pressure fluid (water, washer fluid, air, etc.) from a cleaning nozzle to the surface of the LiDAR sensor, thereby cleaning the surface of the LiDAR sensor.

However, when a blockage or sticky material with high viscosity is attached to the surface of the LiDAR sensor, the conventional apparatus for cleaning a LiDAR sensor may fail to effectively remove the blockage or sticky material.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

According to an aspect of the present disclosure, an apparatus for cleaning a light detection and ranging (LiDAR) sensor can effectively remove a blockage or sticky material attached to a surface of the LiDAR sensor.

According to an aspect of the present disclosure, an apparatus for cleaning a LiDAR sensor may include: a pivot frame rotatably mounted with respect to the LiDAR sensor; a cleaning wire mounted on the pivot frame, and having a straight portion contacting a surface of the LiDAR sensor; and a drive mechanism allowing the pivot frame to rotate, wherein rotating of the pivot frame may allow the straight portion of the cleaning wire to contact the surface of the LiDAR sensor.

The straight portion of the cleaning wire may be tensioned to tightly contact the surface of the LiDAR sensor.

The pivot frame may include a first pivot arm spaced apart from a top surface of the LiDAR sensor, a second pivot arm spaced apart from a bottom surface of the LiDAR sensor, and a pivot shaft connecting the first pivot arm and the second pivot arm.

The drive mechanism may include a roller mounted on a front end of at least one of the first pivot arm or the second pivot arm, and a winder winding or unwinding the cleaning wire guided by the roller.

The straight portion of the cleaning wire may be guided or routed to be tensioned by the roller.

The winder may include a winding roller winding or unwinding the cleaning wire, and a drive motor rotating the winding roller in a winding or unwinding direction.

The drive mechanism may include a roller mounted on the first pivot arm, and a winder horizontally spaced apart from the roller, and one end of the cleaning wire may be wound on or unwound from the winder, and another end of the cleaning wire may be fixed to the second pivot arm.

The drive mechanism may include a first roller mounted on a front end of the first pivot arm, a second roller mounted on a front end of the second pivot arm, and a winder winding or unwinding the cleaning wire guided by the first roller and the second roller.

The straight portion of the cleaning wire may be guided or routed to be tensioned by the first roller and the second roller.

The apparatus may further include a first tension roller adjacent to the first roller, and a second tension roller adjacent to the second roller.

An axis of the first roller may be perpendicular to an axis of the first tension roller.

An axis of the second roller may be perpendicular to an axis of the second tension roller.

The apparatus may further include a return spring arranged and configured to return the pivot frame to an original position.

The apparatus may further include a housing surrounding the pivot frame, wherein the return spring may be mounted on the housing between the pivot frame and the housing so as to connect the pivot frame and the housing to each other.

One end of the return spring may be mounted on at least one of the first pivot arm or the second pivot arm, and another end of the return spring may be connected to a fixed bracket or a housing.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
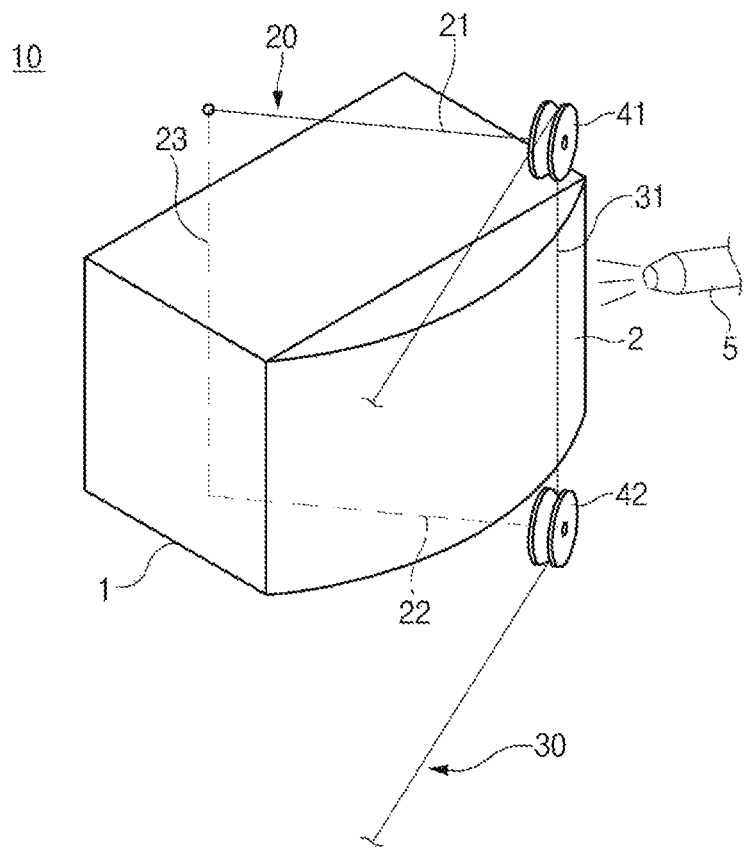
FIG. 1 illustrates a schematic view of an apparatus for cleaning a light detection and ranging (LiDAR) sensor according to an exemplary embodiment of the present disclosure.
Figure 2:
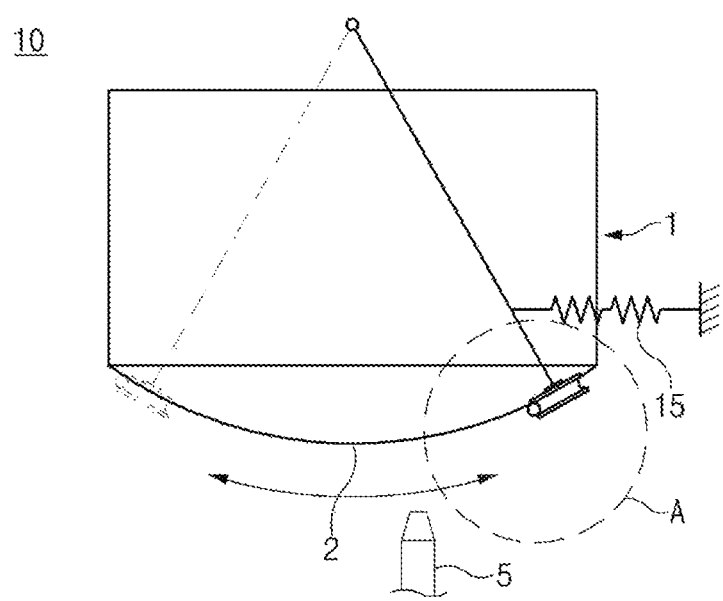
FIG. 2 illustrates a schematic plan view of an apparatus for cleaning a LiDAR sensor according to an exemplary embodiment of the present disclosure.
Figure 3:
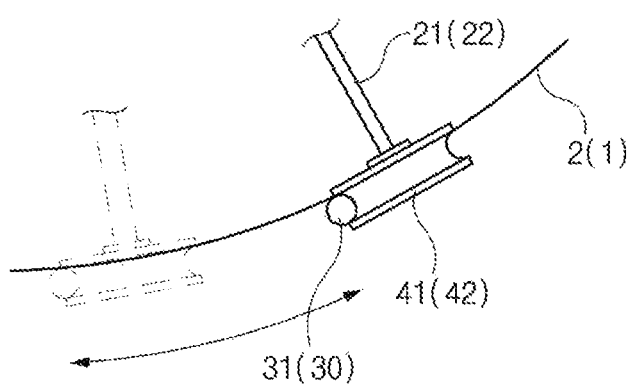
FIG. 3 illustrates an enlarged view of portion A of FIG. 2.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

An apparatus 10 for cleaning a light detection and ranging (LiDAR) sensor according to an exemplary embodiment of the present disclosure may be configured to clean or scrub a surface of a LiDAR sensor 1, thereby removing a blockage or sticky material attached to the surface of the LiDAR sensor 1.

Referring to FIGS. 1 to 4, the apparatus 10 for cleaning a LiDAR sensor may include a pivot frame 20 rotatably mounted with respect to the LiDAR sensor 1, and a cleaning wire 30 mounted on the pivot frame 20.

The pivot frame 20 may be a C-shaped frame. According to an exemplary embodiment of the present disclosure, the pivot frame 20 may include a first pivot arm 21 located above the LiDAR sensor 1, a second pivot arm 22 located below the LiDAR sensor 1, and a pivot shaft 23 connecting the first pivot arm 21 and the second pivot arm 22.

The first pivot arm 21 may be disposed above and spaced apart from a top surface of the LiDAR sensor 1. A front end of the first pivot arm 21 may be adjacent to a front surface 2 of the LiDAR sensor 1, and a rear end of the first pivot arm 21 may be adjacent to the rear of the LiDAR sensor 1.

The second pivot arm 22 may be disposed below and spaced apart from a bottom surface of the LiDAR sensor 1. A front end of the second pivot arm 22 may be adjacent to the front surface 2 of the LiDAR sensor 1, and a rear end of the second pivot arm 22 may be adjacent to the rear of the LiDAR sensor 1.

The pivot shaft 23 may connect the rear end of the first pivot arm 21 and the rear end of the second pivot arm 22. The pivot shaft 23 may extend vertically, and the pivot shaft 23 may be rotatable. The first and second pivot arms 21 and 22 may be rotatable with respect to an axis of the pivot shaft 23.

The cleaning wire 30 may be mounted to traverse the front end of the first pivot arm 21 and the front end of the second pivot arm 22. In particular, the cleaning wire 30 may tightly contact the surface of the LiDAR sensor 1. Thus, the rotating of the pivot frame 20 may allow the cleaning wire 30 to scrub or contact the surface of the LiDAR sensor 1 so that a blockage or sticky material with high viscosity attached to the surface of the LiDAR sensor 1 may be physically removed.

According to an exemplary embodiment of the present disclosure, the cleaning wire 30 may be made of a material having high tensile, high frictional resistance, and low coefficient of friction.

The front surface 2 of the LiDAR sensor 1 may be curved to increase its detection range, and the pivot frame 20 may pivot around the pivot shaft 23 to correspond to the curved front surface 2 of the LiDAR sensor 1. The cleaning wire 30 tightly contacting the curved front surface 2 of the LiDAR sensor 1 may scrub off the blockage or sticky material with high viscosity attached to the front surface 2 of the LiDAR sensor 1 by the rotating of the pivot frame 20, thereby effectively cleaning the front surface 2 of the LiDAR sensor 1.

The apparatus 10 for cleaning a LiDAR sensor may include a housing 11 surrounding the pivot frame 20. In addition, the apparatus 10 for cleaning a LiDAR sensor may include a nozzle mechanism having a cleaning nozzle 5 injecting a high-pressure fluid (e.g., a cleaning fluid, air, etc.). The cleaning nozzle 5 may be mounted in the housing 11. As the high-pressure fluid is injected to the surface of the LiDAR sensor 1 by the cleaning nozzle 5, a foreign object with relatively low viscosity may be removed. Thereafter, as the pivot frame 20 rotates, the cleaning wire 30 may physically remove the blockage or sticky material with high viscosity attached to the front surface of the LiDAR sensor 1. That is, the apparatus 10 for cleaning a LiDAR sensor according to the exemplary embodiment of the present disclosure may use the cleaning nozzle 5 and the cleaning wire 30 in combination or independently, thereby significantly improving cleaning efficiency with respect to the LiDAR sensor 1.

The apparatus 10 for cleaning a LiDAR sensor according to an exemplary embodiment of the present disclosure may include a drive mechanism 40 moving the cleaning wire 30 to allow the pivot frame 20 to rotate.

According to an exemplary embodiment of the present disclosure, the drive mechanism 40 may include one or more rollers 41 and 42 mounted on the pivot frame 20, and a winder 45 winding or unwinding the cleaning wire 30 guided by the rollers 41 and 42.

The cleaning wire 30 may have a straight portion 31 guided or routed to straightly be tensioned by at least one of the rollers 41 and 42. The straight portion 31 of the cleaning wire 30 may be guided or routed by at least one of the rollers 41 and 42 to tightly contact the front surface 2 of the LiDAR sensor 1.

Referring to FIGS. 1 to 9, the drive mechanism 40 may include a first roller 41 mounted on the front end of the first pivot arm 21, and a second roller 42 mounted on the front end of the second pivot arm 22. The first roller 41 may be rotatably mounted on the front end of the first pivot arm 21, and the second roller 42 may be rotatably mounted on the front end of the second pivot arm 22. The straight portion 31 of the cleaning wire 30 may be guided or routed to be tensioned by the first roller 41 and the second roller 42 to tightly contact the front surface 2 of the LiDAR sensor 1.

Figure 4:
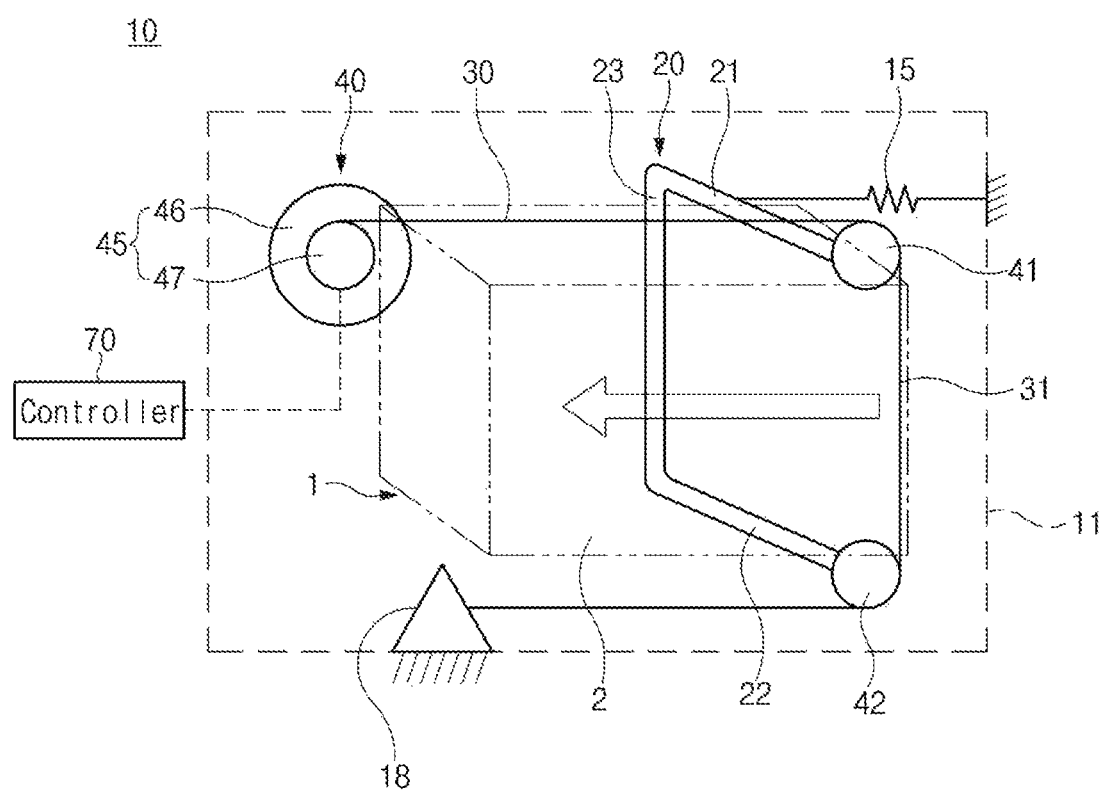
FIG. 4 illustrates the entirety of an apparatus for cleaning a LiDAR sensor according to an exemplary embodiment of the present disclosure.

Referring to FIG. 4, the winder 45 may include a winding roller 46 winding or unwinding the cleaning wire 30, and a drive motor 47 rotating the winding roller 46 in a winding or unwinding direction. The drive motor 47 may be controlled by a controller 70. As the drive motor 47 of the winder 45 rotates the winding roller 46 in the winding direction, the cleaning wire 30 may be wound on the winding roller 46 of the winder 45, and as the drive motor 47 of the winder 45 rotates the winding roller 46 in the unwinding direction, the cleaning wire 30 may be unwound from the winding roller 46 of the winder 45.

One end of the cleaning wire 30 may be connected to the winding roller 46 of the winder 45 so that the cleaning wire 30 may be wound on or unwound from the winding roller 46. Another end of the cleaning wire 30 may be fixed to a fixed bracket or a fixed member 18 provided in the housing 11.

The pivot frame 20 may return to its original position by a return spring 15. The return spring 15 may be mounted to connect between the pivot frame 20 and the housing 11. When the drive motor 47 does not operate, the pivot frame 20 may return to the original position by a restoring force of the return spring 15. One end of the return spring 15 may be mounted on at least one of the first pivot arm 21 or the second pivot arm 22, and another end of the return spring 15 may be connected to a fixed bracket or the housing 11.

Figure 5:
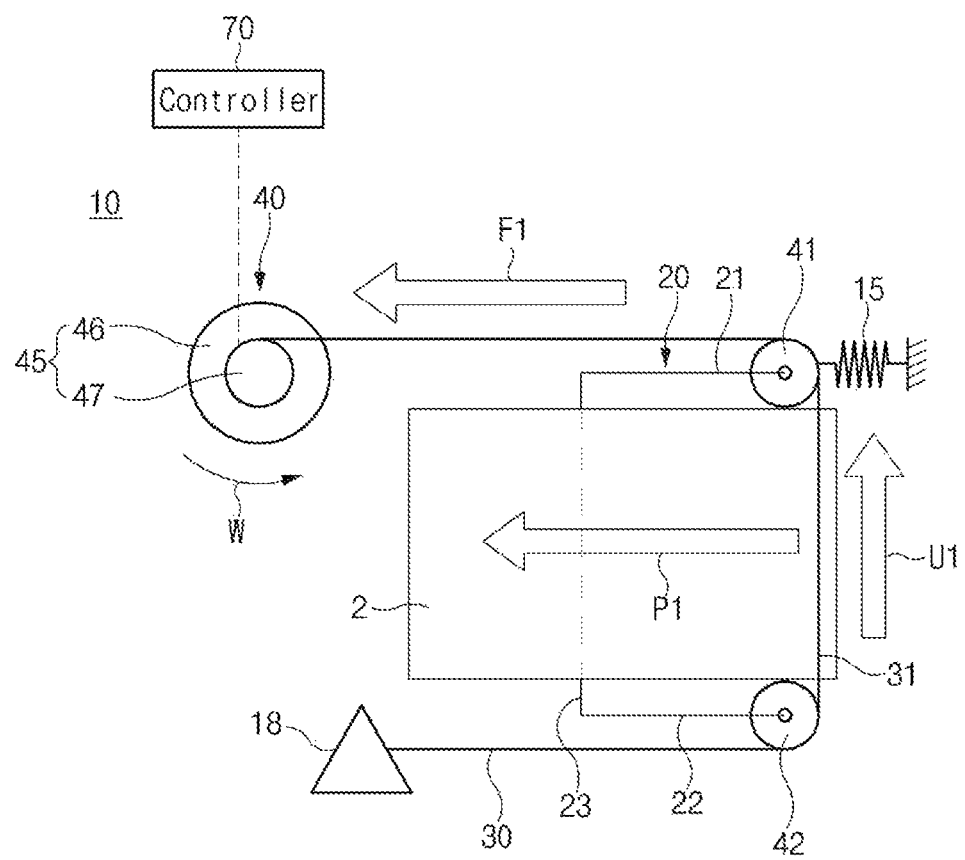
FIG. 5 illustrates a state in which a cleaning wire starts to be pulled toward a winding roller by a drive mechanism in an apparatus for cleaning a LiDAR sensor according to an exemplary embodiment of the present disclosure.
Figure 6:
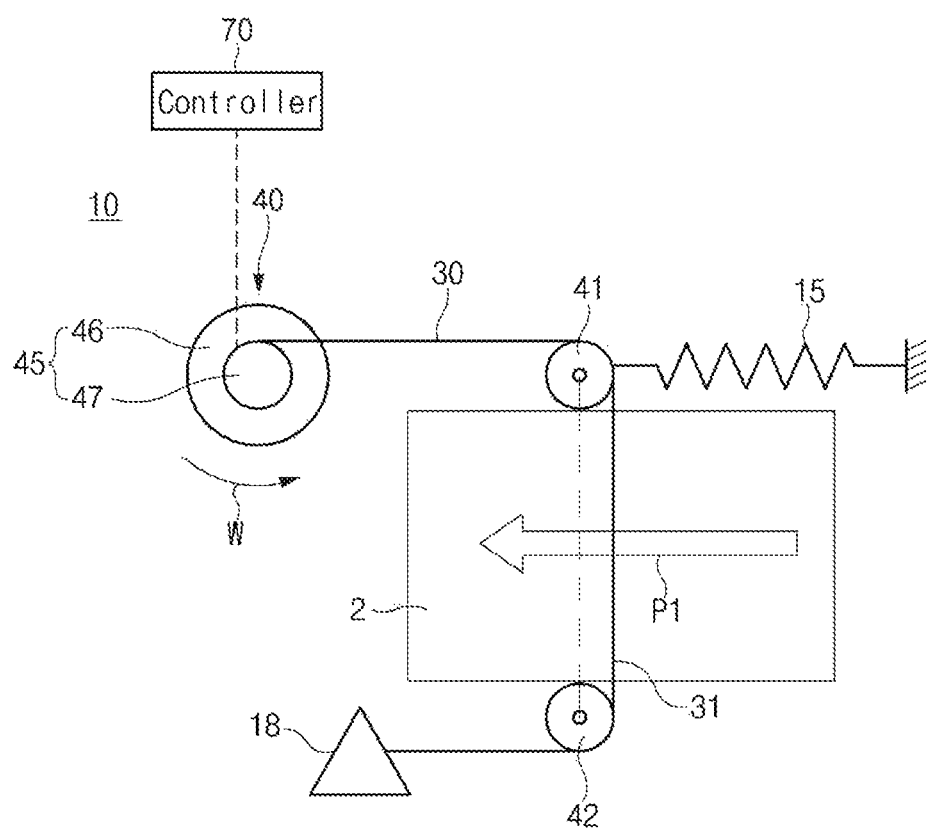
FIG. 6 illustrates a state in which a cleaning wire is being pulled toward a winding roller by a drive mechanism in an apparatus for cleaning a LiDAR sensor according to an exemplary embodiment of the present disclosure.
Figure 7:
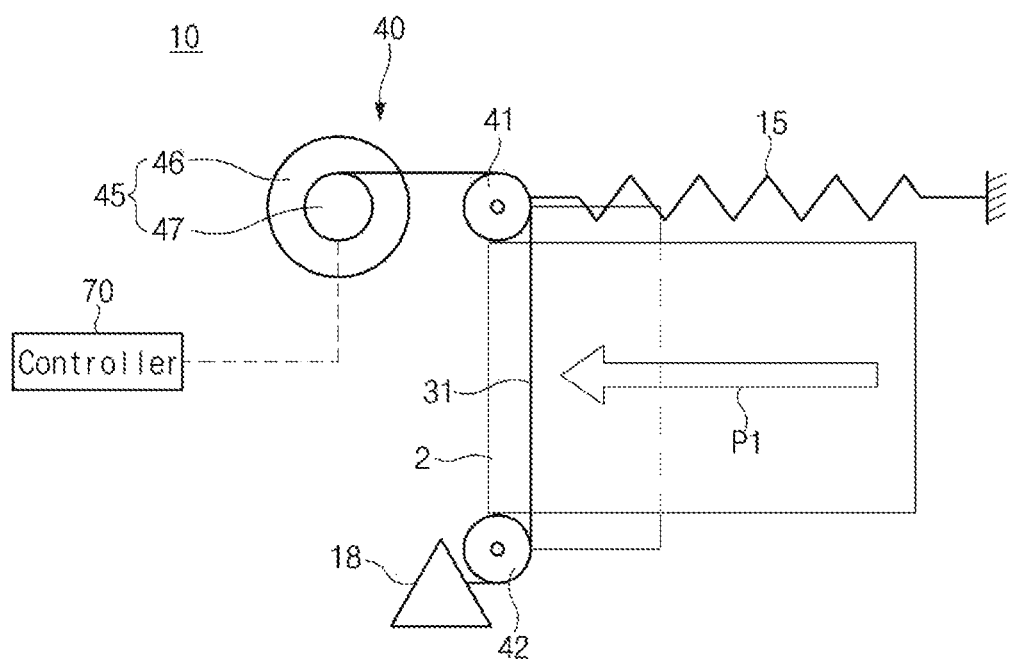
FIG. 7 illustrates a state in which a cleaning wire is completely pulled toward a winding roller by a drive mechanism in an apparatus for cleaning a LiDAR sensor according to an exemplary embodiment of the present disclosure.

As illustrated in FIGS. 5 to 7, as the drive motor 47 rotates the winding roller 46 in the winding direction (see a direction indicated by arrow W), the cleaning wire 30 may be wound on the winding roller 46, and accordingly the cleaning wire 30 may move horizontally from the first roller 41 to the winding roller 46 (see a direction indicated by arrow F1), and move vertically upwards from the second roller 42 to the first roller 41 (see a direction indicated by arrow U1). Thus, the cleaning wire 30 may pull the first and second rollers 41 and 42 and the pivot frame 20 toward the winding roller 46, and the pivot frame 20 may pivot toward the winding roller 46 (see a direction indicated by arrow P1). As the cleaning wire 30 moves in a vertical upward direction and a leftward direction in a state in which it contacts the front surface 2 of the LiDAR sensor 1, the straight portion 31 of the cleaning wire 30 may scrub the front surface 2 of the LiDAR sensor 1, thereby effectively removing the blockage or sticky material attached to the front surface 2 of the LiDAR sensor 1.

Figure 8:
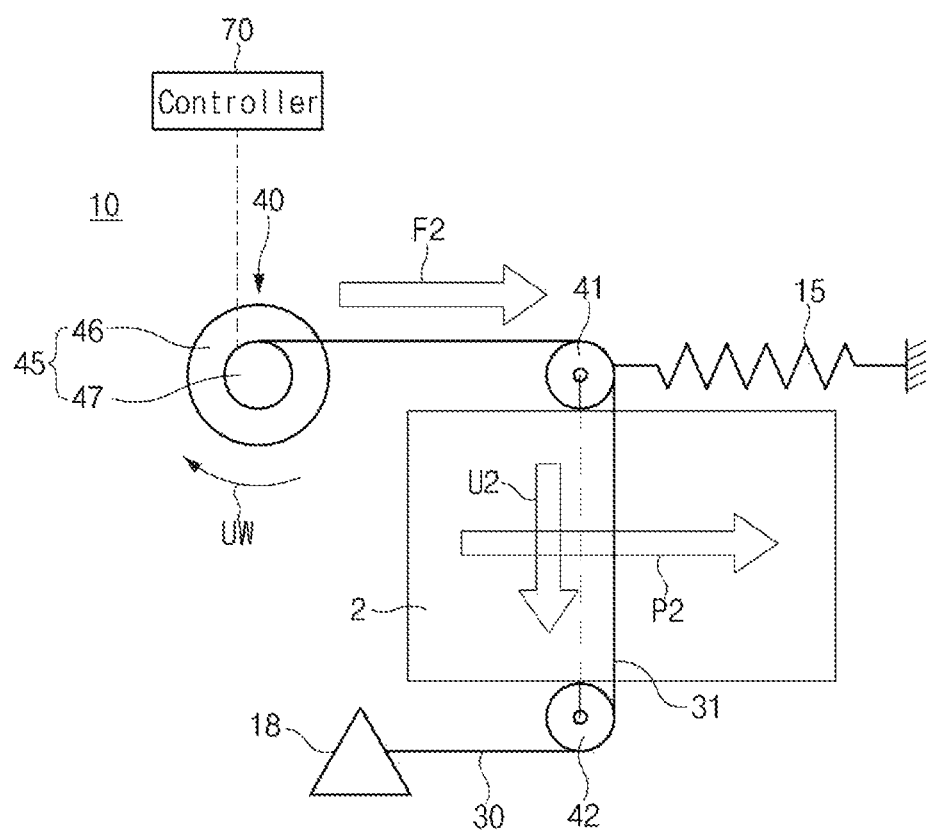
FIG. 8 illustrates a state in which a cleaning wire starts to be unwound from a winding roller by a drive mechanism in an apparatus for cleaning a LiDAR sensor according to an exemplary embodiment of the present disclosure.
Figure 9:
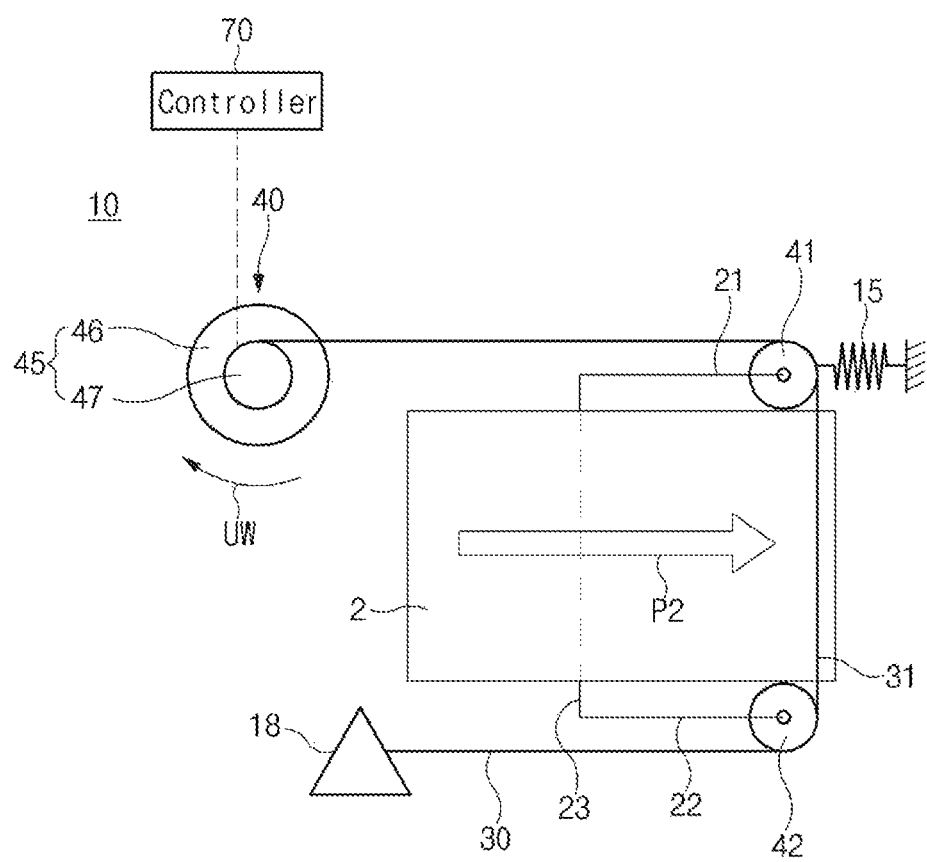
FIG. 9 illustrates a state in which a cleaning wire is completely unwound from a winding roller by a drive mechanism in an apparatus for cleaning a LiDAR sensor according to an exemplary embodiment of the present disclosure.

As illustrated in FIGS. 8 and 9, as the drive motor 47 rotates the winding roller 46 in the unwinding direction (see a direction indicated by arrow UW), the cleaning wire 30 may be unwound from the winding roller 46, and accordingly the cleaning wire 30 may move horizontally from the winding roller 46 to the first roller 41 (see a direction indicated by arrow F2), and move vertically downwards the first roller 41 to the second roller 42 (see a direction indicated by arrow U2). Since the cleaning wire 30 does not pull the first and second rollers 41 and 42 and the pivot frame 20, the pivot frame 20 may be pivotally moved away from the winding roller 46 by the restoring force of the return spring 15 (see a direction indicated by arrow P2). As the cleaning wire 30 moves in a vertical downward direction and a rightward direction in a state in which it contacts the front surface 2 of the LiDAR sensor 1, the straight portion 31 of the cleaning wire 30 may scrub the front surface 2 of the LiDAR sensor 1, thereby effectively removing the blockage or sticky material attached to the front surface 2 of the LiDAR sensor 1.

According to exemplary embodiments of the present disclosure, as the cleaning wire 30 moves in a height direction and a width direction of the LiDAR sensor 1 in a state in which the straight portion 31 of the cleaning wire 30 contacts the front surface 2 of the LiDAR sensor 1, the blockage or sticky material attached to the front surface 2 of the LiDAR sensor 1 may be effectively removed.

Figure 10:
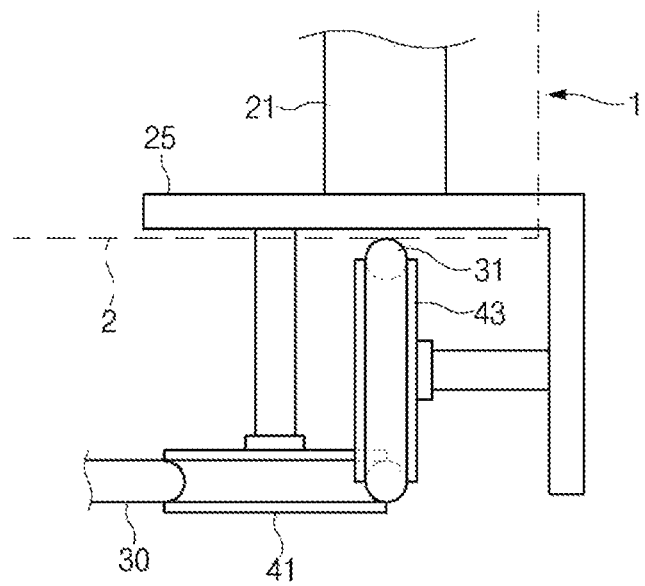
FIG. 10 illustrates a plan view of a first roller and a first tension roller in an apparatus for cleaning a LiDAR sensor according to an exemplary embodiment of the present disclosure.
Figure 11:
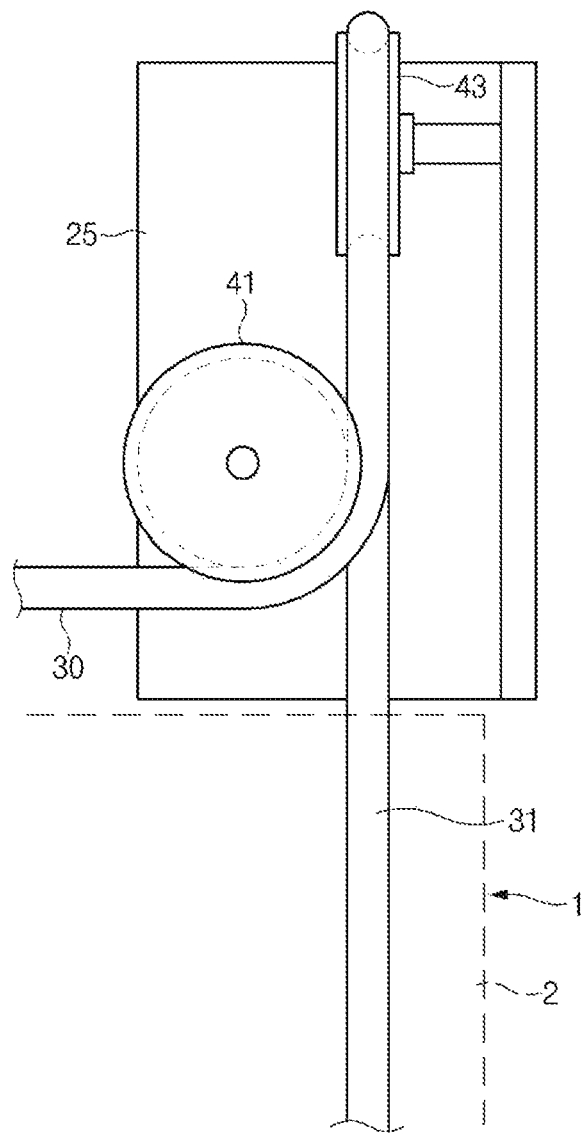
FIG. 11 illustrates a front view of a first roller and a first tension roller in an apparatus for cleaning a LiDAR sensor according to an exemplary embodiment of the present disclosure.
Figure 12:
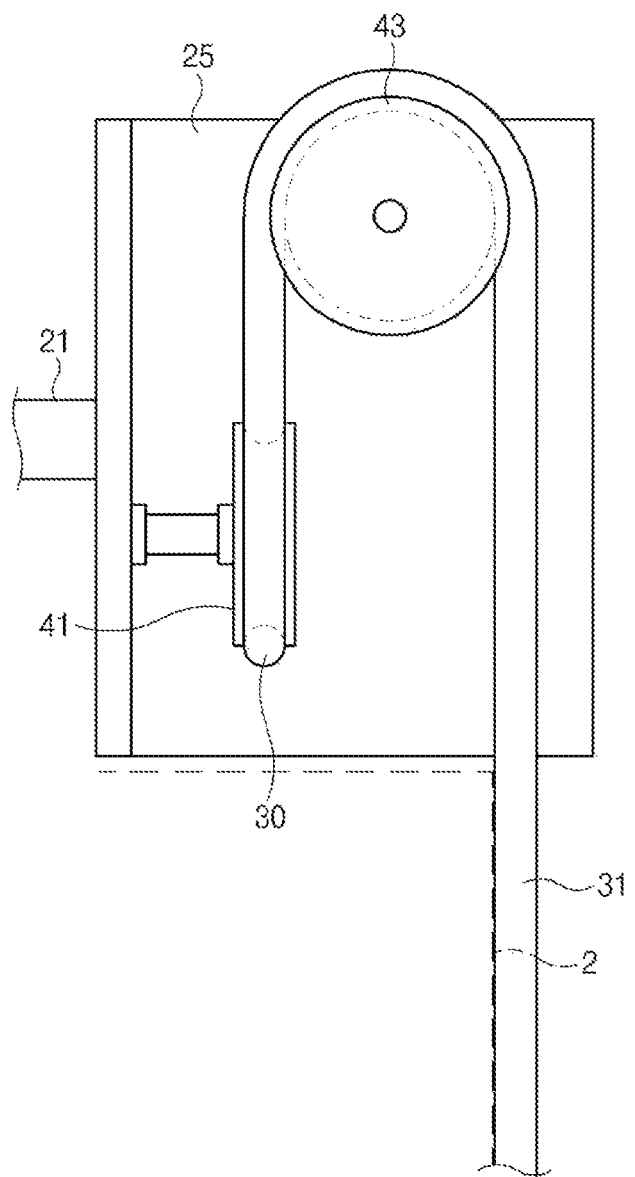
FIG. 12 illustrates a side view of a first roller and a first tension roller in an apparatus for cleaning a LiDAR sensor according to an exemplary embodiment of the present disclosure.

Referring to FIGS. 10 to 12, the drive mechanism 40 may further include a first tension roller 43 adjacent to the first roller 41. The first roller 41 and the first tension roller 43 may be mounted to the front end of the first pivot arm 21 via a L-shaped bracket 25. The L-shaped bracket 25 may be coupled to the front end of the first pivot arm 21, the first roller 41 and the first tension roller 43 may be rotatably mounted on the L-shaped bracket 25.

The first tension roller 43 may be positioned above the first roller 41, and an axis of the first tension roller 43 may be perpendicular to an axis of the first roller 41. Thus, the cleaning wire 30 may be sequentially guided by the first roller 41 and the first tension roller 43 so that tension of the cleaning wire 30, especially tension with respect to the straight portion 31 of the cleaning wire 30, may be increased.

Figure 13:
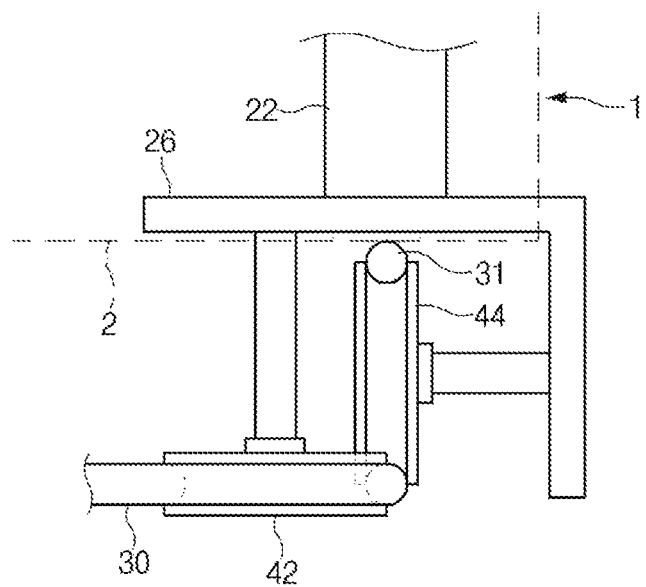
FIG. 13 illustrates a plan view of a second roller and a second tension roller in an apparatus for cleaning a LiDAR sensor according to an exemplary embodiment of the present disclosure.
Figure 14:
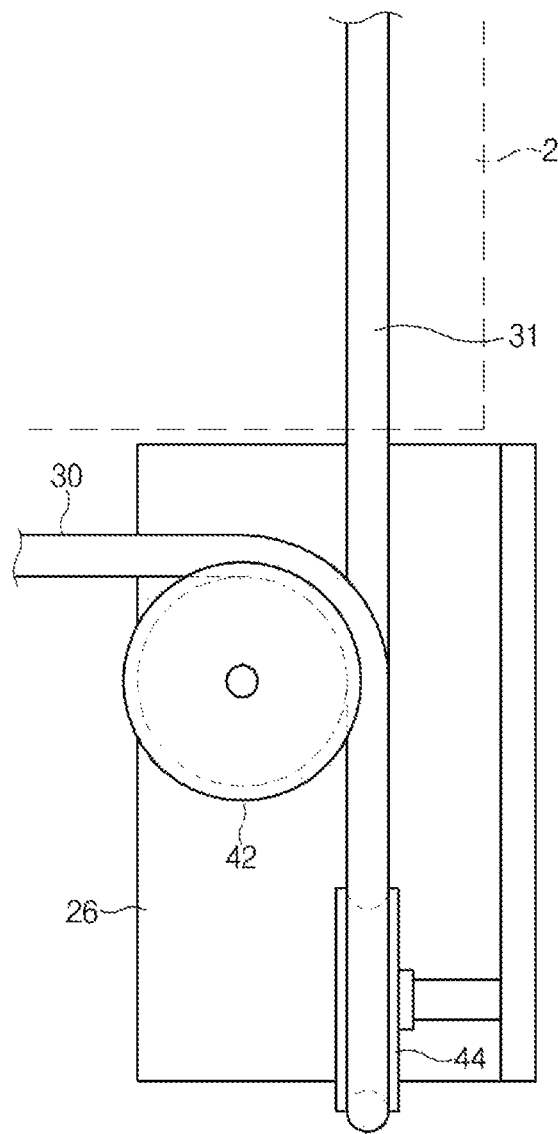
FIG. 14 illustrates a front view of a second roller and a second tension roller in an apparatus for cleaning a LiDAR sensor according to an exemplary embodiment of the present disclosure.
Figure 15:
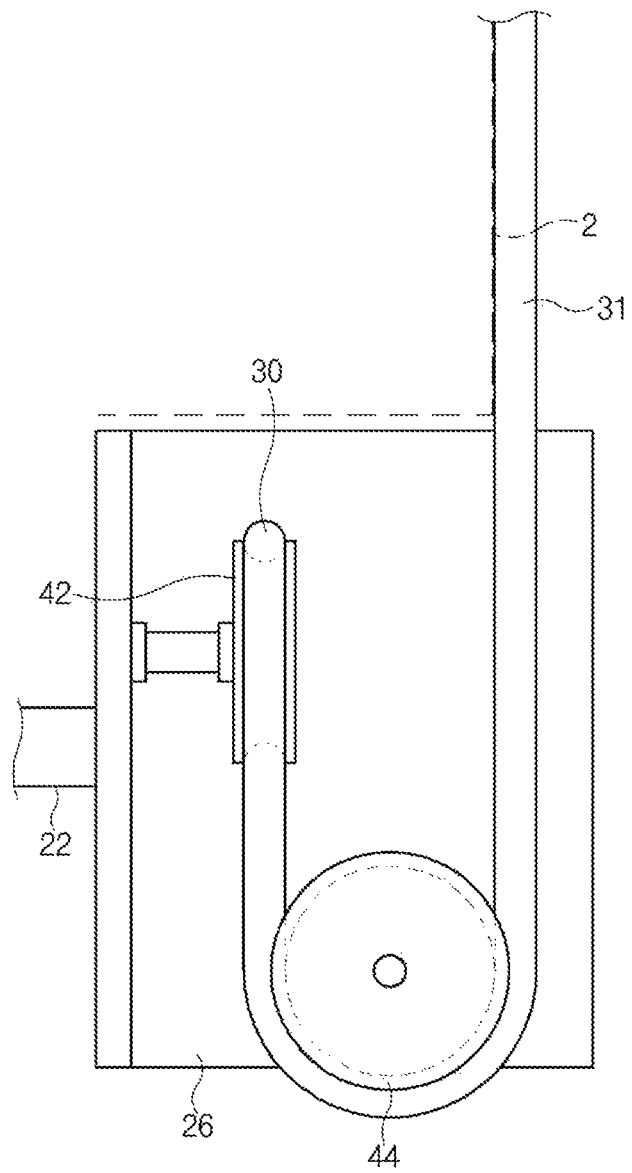
FIG. 15 illustrates a side view of a second roller and a second tension roller in an apparatus for cleaning a LiDAR sensor according to an exemplary embodiment of the present disclosure.

Referring to FIGS. 13 to 15, the drive mechanism 40 may further include a second tension roller 44 adjacent to the second roller 42. The second roller 42 and the second tension roller 44 may be mounted to the front end of the second pivot arm 22 via a L-shaped bracket 26. The L-shaped bracket 26 may be coupled to the front end of the second pivot arm 22, the second roller 42 and the second tension roller 44 may be rotatably mounted on the L-shaped bracket 26.

The second tension roller 44 may be positioned below the second roller 42, and an axis of the second tension roller 44 may be perpendicular to an axis of the second roller 42. Thus, the cleaning wire 30 may be sequentially guided by the second tension roller 44 and the second roller 42 so that tension of the cleaning wire 30, especially tension with respect to the straight portion 31 of the cleaning wire 30, may be increased.

Figure 16:
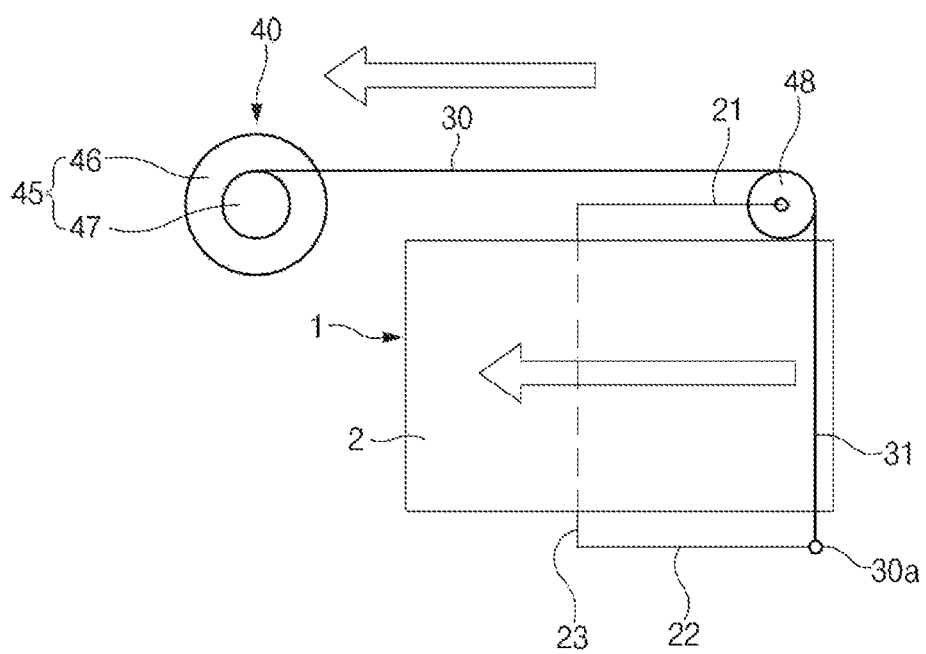
FIG. 16 illustrates an apparatus for cleaning a LiDAR sensor according to another exemplary embodiment of the present disclosure.

Referring to FIG. 16, according to another exemplary embodiment of the present disclosure, one end of the cleaning wire 30 may be connected to the winding roller 46 of the winder 45 to be wound or unwound, and another end of the cleaning wire 30 may be fixed to any one of the first pivot arm 21 and the second pivot arm 22 of the pivot frame 20.

A roller 48 may be mounted on any one of the first pivot arm 21 and the second pivot arm 22 of the pivot frame 20. The cleaning wire 30 may be guided from its fixed end toward the roller 48. For example, as illustrated in FIG. 16, the roller 48 may be mounted on the front end of the first pivot arm 21, and another end of the cleaning wire 30 may be fixed to the second pivot arm 22. The winder 45 may be horizontally spaced apart from the roller 48.

According to an exemplary embodiment illustrated in FIG. 16, the number of rollers may be reduced, and thus a relatively simple structure may be created.

Since the other configuration and operations in this embodiment are similar to or the same as those according to the preceding embodiments, a detailed description thereof will be omitted.

Figure 17:
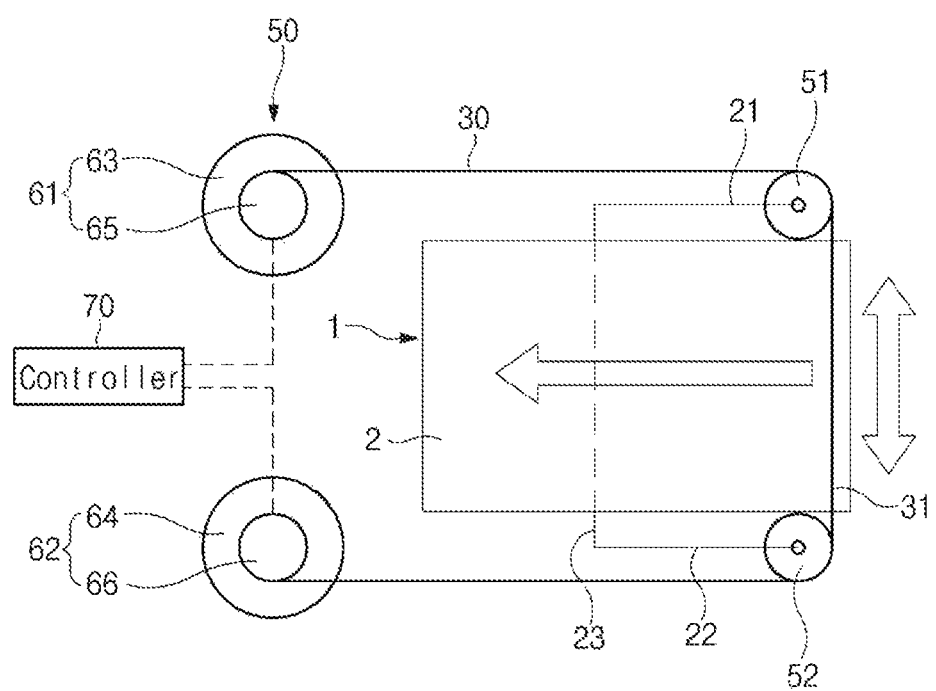
FIG. 17 illustrates an apparatus for cleaning a LiDAR sensor according to another exemplary embodiment of the present disclosure.

Referring to FIG. 17, a drive mechanism 50 in the apparatus 10 for cleaning a LiDAR sensor according to another exemplary embodiment of the present disclosure may include a first winder 61 and a second winder 62 individually connected to both ends of the cleaning wire 30.

The first winder 61 may include a first winding roller 63 to which one end of the cleaning wire 30 is connected to be wound or unwound, and a first drive motor 65 rotating the first winding roller 63 in a winding direction and in an unwinding direction.

The first winder 61 may be located at substantially the same height as that of a first roller 51, so that the cleaning wire 30 may be guided horizontally between the first winder 61 and the first roller 51.

The second winder 62 may include a second winding roller 64 to which another end of the cleaning wire 30 is connected to be wound or unwound, and a second drive motor 66 rotating the second winding roller 64 in a winding direction and in an unwinding direction.

The second winder 62 may be located at substantially the same height as that of a second roller 52, so that the cleaning wire 30 may be guided horizontally between the second winder 62 and the second roller 52.

A direction in which the first winding roller 63 winds the cleaning wire 30 may be opposite to a direction in which the second winding roller 64 winds the cleaning wire 30. For example, the first winding roller 63 may wind the cleaning wire 30 in a counterclockwise direction, and the second winding roller 64 may wind the cleaning wire 30 in a clockwise direction.

The first drive motor 65 and the second drive motor 66 may be alternately operated by the controller 70.

For example, the first drive motor 65 may rotate the first winding roller 63 in the winding direction and the second drive motor 66 may stop so that one end of the cleaning wire 30 may be wound on the first winding roller 63. The cleaning wire 30 may move vertically upwards from the second roller 52 to the first roller 51 and move horizontally toward the first winding roller 63. As the cleaning wire 30 is wound on the first winding roller 63 by the first drive motor 65, the cleaning wire 30 may pull the first roller 51 and the second roller 52 toward the first and second winders 61 and 62, so that the pivot frame 20 may pivot toward the first and second winders 61 and 62.

In another example, the second drive motor 66 may rotate the second winding roller 64 in the winding direction and the first drive motor 65 may stop so that another end of the cleaning wire 30 may be wound on the second winding roller 64. The cleaning wire 30 may move vertically downwards from the first roller 51 to the second roller 52 and move horizontally toward the second winding roller 64. As the cleaning wire 30 is wound on the second winding roller 64 by the second drive motor 66, the cleaning wire 30 may pull the first roller 51 and the second roller 52 toward the first and second winders 61 and 62, so that the pivot frame 20 may pivot toward the first and second winders 61 and 62.

Since the other configuration and operations in this embodiment are similar to or the same as those according to the preceding embodiments, a detailed description thereof will be omitted.

Figure 18:
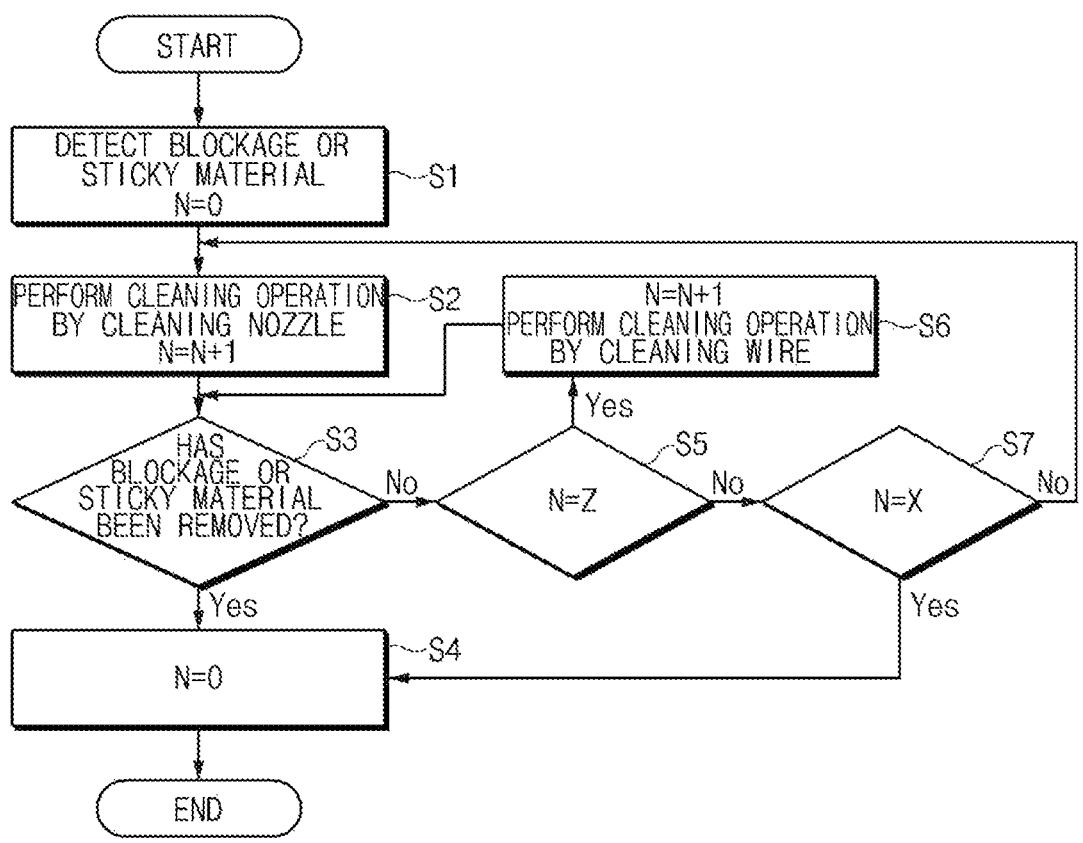
FIG. 18 illustrates a flowchart of a method for cleaning a LiDAR sensor using an apparatus for cleaning a LiDAR sensor according to an exemplary embodiment of the present disclosure.

FIG. 18 illustrates a flowchart of a method for controlling the apparatus 10 for cleaning a LiDAR sensor according to an exemplary embodiment of the present disclosure.

The controller 70 may detect a blockage or sticky material attached to a surface of the LiDAR sensor 1, especially, the front surface 2 of the LiDAR sensor 1, and may set a cleaning count N to "0" in operation S1.

The controller 70 may control the nozzle mechanism to allow the cleaning nozzle 5 to perform a cleaning operation by injecting a high-pressure fluid to the surface of the LiDAR sensor 1, thereby increasing the cleaning count N to "1" in operation S2.

The controller 70 may determine whether the blockage or sticky material attached to the surface of the LiDAR sensor 1 has been removed in operation S3.

When the blockage or sticky material has been removed in operation S3, the cleaning count N may be set to "0" in operation S4, and the cleaning operation may end.

When the blockage or sticky material has not been removed in operation S3, it may be determined whether the cleaning count N is equal to a first set value Z in operation S5. The first set value Z may be a cleaning count reference value allowing the cleaning wire 30 to perform the cleaning operation.

When the cleaning count N is equal to the first set value Z, the cleaning operation may be performed by the cleaning wire 30 as illustrated in FIGS. 4 to 9, and thus the cleaning count N may be increased by "1" in operation S6.

When the cleaning count N is not equal to the first set value Z, it may be determined whether the cleaning count N is equal to a second set value X in operation S7. The second set value X may be a cleaning count reference value allowing the cleaning nozzle 5 to end the cleaning operation when the blockage or sticky material has been removed.

When the cleaning count N is equal to the second set value X, the cleaning count N may be set to "0" in operation S4, and the cleaning operation may end. When the cleaning count N is not equal to the second set value X, the controller 70 may return to operation S2.

According to exemplary embodiments of the present disclosure, the cleaning wire may scrub the surface of the LiDAR sensor, thereby effectively removing the blockage or sticky material attached to the surface of the LiDAR sensor.

In addition, as the high-pressure fluid is injected to the surface of the LiDAR sensor by the cleaning nozzle, the foreign object with relatively low viscosity may be removed. Thereafter, as the pivot frame rotates, the cleaning wire may physically remove the blockage or sticky material with high viscosity attached to the front surface of the LiDAR sensor.

By using the cleaning nozzle and the cleaning wire in combination or independently of each other, the cleaning efficiency with respect to the LiDAR sensor may be further improved.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A cleaning system comprising:
   a light detection and ranging (LiDAR) sensor;
   a pivot frame rotatably mounted with respect to the LiDAR sensor;
   a cleaning wire mounted on the pivot frame, and having a straight portion contacting a surface of the LiDAR sensor; and
   a drive mechanism allowing the pivot frame to rotate,
   wherein rotating of the pivot frame allows the straight portion of the cleaning wire to contact the surface of the LiDAR sensor.

2. The cleaning system according to claim 1, wherein the straight portion of the cleaning wire is tensioned to tightly contact the surface of the LiDAR sensor.

3. The cleaning system according to claim 1, wherein the pivot frame includes a first pivot arm spaced apart from a top surface of the LiDAR sensor, a second pivot arm spaced apart from a bottom surface of the LiDAR sensor, and a pivot shaft connecting the first pivot arm and the second pivot arm.

4. The cleaning system according to claim 3, wherein the drive mechanism includes a roller mounted on a front end of at least one of the first pivot arm or the second pivot arm, and a winder winding or unwinding the cleaning wire guided by the roller.

5. The cleaning system according to claim 4, wherein the straight portion of the cleaning wire is guided or routed to be tensioned by the roller.

6. The cleaning system according to claim 4, wherein the winder includes a winding roller winding or unwinding the cleaning wire, and a drive motor rotating the winding roller in a winding or unwinding direction.

7. The cleaning system according to claim 3, wherein the drive mechanism includes a roller mounted on the first pivot arm, and a winder horizontally spaced apart from the roller, and
   one end of the cleaning wire is wound on or unwound from the winder, and another end of the cleaning wire is fixed to the second pivot arm.

8. The cleaning system according to claim 3, wherein the drive mechanism includes a first roller mounted on a front end of the first pivot arm, a second roller mounted on a front end of the second pivot arm, and a winder winding or unwinding the cleaning wire guided by the first roller and the second roller.

9. The cleaning system according to claim 8, wherein the straight portion of the cleaning wire is guided or routed to be tensioned by the first roller and the second roller.

10. The cleaning system according to claim 8, further comprising a first tension roller adjacent to the first roller, and a second tension roller adjacent to the second roller.

11. The cleaning system according to claim 10, wherein an axis of the first roller is perpendicular to an axis of the first tension roller.

12. The cleaning system according to claim 10, wherein an axis of the second roller is perpendicular to an axis of the second tension roller.

13. The cleaning system according to claim 1, further comprising a return spring arranged and configured to return the pivot frame to an original position.

14. The cleaning system according to claim 13, further comprising a housing surrounding the pivot frame, wherein the return spring is mounted on the housing between the pivot frame and the housing so as to connect the pivot frame and the housing to each other.

15. The cleaning system according to claim 13, wherein one end of the return spring is mounted on at least one of the first pivot arm or the second pivot arm, and another end of the return spring is connected to a fixed bracket or a housing.

* * * * *